United States Patent
Suwa

(10) Patent No.: US 9,350,042 B2
(45) Date of Patent: May 24, 2016

(54) NONAQUEOUS ELECTROLYTE SECONDARY BATTERY

(75) Inventor: Hiromitsu Suwa, Moriguchi (JP)

(73) Assignee: SANYO Electric Co., Ltd., Osaka (JP)

( * ) Notice: Subject to any disclaimer, the term of this patent is extended or adjusted under 35 U.S.C. 154(b) by 265 days.

(21) Appl. No.: 13/981,192

(22) PCT Filed: Jan. 24, 2012

(86) PCT No.: PCT/JP2012/051397
§ 371 (c)(1),
(2), (4) Date: Jul. 23, 2013

(87) PCT Pub. No.: WO2012/105362
PCT Pub. Date: Aug. 9, 2012

(65) Prior Publication Data
US 2013/0316207 A1  Nov. 28, 2013

(30) Foreign Application Priority Data
Feb. 3, 2011  (JP) .................................. 2011-022152

(51) Int. Cl.
*H01M 10/04* (2006.01)
*H01M 10/05* (2010.01)
(Continued)

(52) U.S. Cl.
CPC .......... *H01M 10/0431* (2013.01); *H01M 2/263* (2013.01); *H01M 10/05* (2013.01); *H01M 10/0587* (2013.01)

(58) Field of Classification Search
CPC ............ H01M 10/0431; H01M 10/05; H01M 10/0587; H01M 2/20; H01M 2/22; H01M 2/26; H01M 2/263
See application file for complete search history.

(56) References Cited

U.S. PATENT DOCUMENTS 4,507,368 A * 3/1985 Hashimoto ..................... 429/62
4,975,095 A * 12/1990 Strickland et al. .......... 29/623.1
(Continued)

FOREIGN PATENT DOCUMENTS

CN  1801519 A  7/2006
CN  1870345 A  11/2006
(Continued)

OTHER PUBLICATIONS

Instron website guide to Vickers Test, accessed Jun. 19, 2015 at http://www.instron.com/en-us/our-company/library/test-types/hardness-test/Vickers-test?region=North%20America.*
(Continued)

*Primary Examiner* — Ula C Ruddock
*Assistant Examiner* — Amanda Barrow
(74) *Attorney, Agent, or Firm* — Westerman, Hattori, Daniels & Adrian, LLP

(57) ABSTRACT

The nonaqueous electrolyte secondary battery includes a wound electrode body in which a positive and a negative electrode plates are wound with a separator therebetween and an air gap portion is formed at the winding axis center. A negative electrode collector tab is joined to a negative electrode exposed portion on the winding start side. This collector tab is bent so as to be touched and joined to the inside bottom portion of a battery exterior can at the position corresponding to the air gap portion. In a plan view, the air gap portion of is formed in a shape having an arc portion and a chord portion. In a plan view, the negative electrode collector tab is made to be linear along the chord portion of the negative electrode exposed portion on the winding start side, and is joined to the negative electrode exposed portion at this chord portion.

4 Claims, 5 Drawing Sheets

(51) Int. Cl.
*H01M 10/0587* (2010.01)
*H01M 2/26* (2006.01)

(56) References Cited

U.S. PATENT DOCUMENTS

| | | | | |
|---|---|---|---|---|
| 5,017,442 | A * | 5/1991 | Watanabe et al. | 429/94 |
| 5,658,683 | A * | 8/1997 | Kageyama | H01M 6/10 29/623.1 |
| 5,791,041 | A * | 8/1998 | Miyata et al. | 29/829 |
| 2004/0232882 | A1 * | 11/2004 | Yanagawa | H01M 6/10 320/112 |
| 2005/0123824 | A1 * | 6/2005 | Ishikawa | H01M 10/0431 429/94 |
| 2006/0115736 | A1 | 6/2006 | Hashimoto et al. | |
| 2006/0240319 | A1 | 10/2006 | Chun | |
| 2007/0180686 | A1 * | 8/2007 | Woo | H01M 6/10 29/623.1 |
| 2008/0070111 | A1 * | 3/2008 | Abe et al. | 429/163 |

FOREIGN PATENT DOCUMENTS

| | | | | |
|---|---|---|---|---|
| CN | 101442135 | A | 5/2009 | |
| DE | 602006006107 | D | 5/2009 | |
| EP | 1717894 | A1 | 11/2006 | |
| JP | 60-059667 | * | 4/1985 | H01M 6/10 |
| JP | 02-132758 | * | 5/1990 | H01M 2/22 |
| JP | 06-196138 | A | 7/1994 | |
| JP | 2006-134758 | A | 5/2006 | |
| JP | 2006-139918 | A | 6/2006 | |
| JP | 2006-310283 | A | 11/2006 | |
| JP | 2007-250414 | A | 9/2007 | |
| JP | 2009-170365 | * | 7/2009 | H01M 2/26 |
| JP | 2009-170365 | A | 7/2009 | |
| KR | 20060052512 | A | 5/2006 | |
| KR | 2006-0111838 | A | 10/2006 | |
| TW | 291778 | B | 10/1994 | |

OTHER PUBLICATIONS

International Search Report of PCT/JP2012/051397, mailing date of Mar. 13, 2012.

* cited by examiner

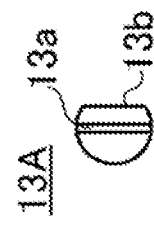
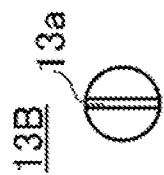
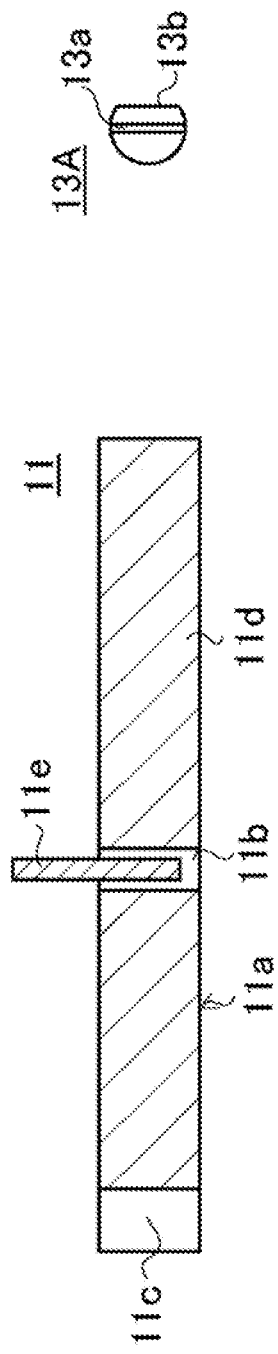
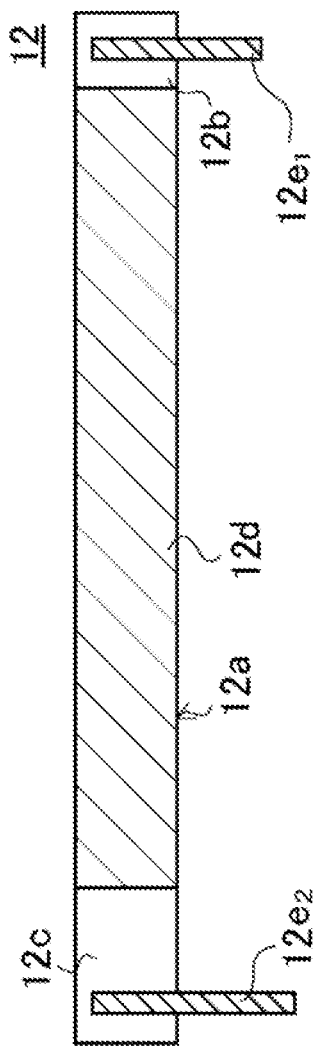

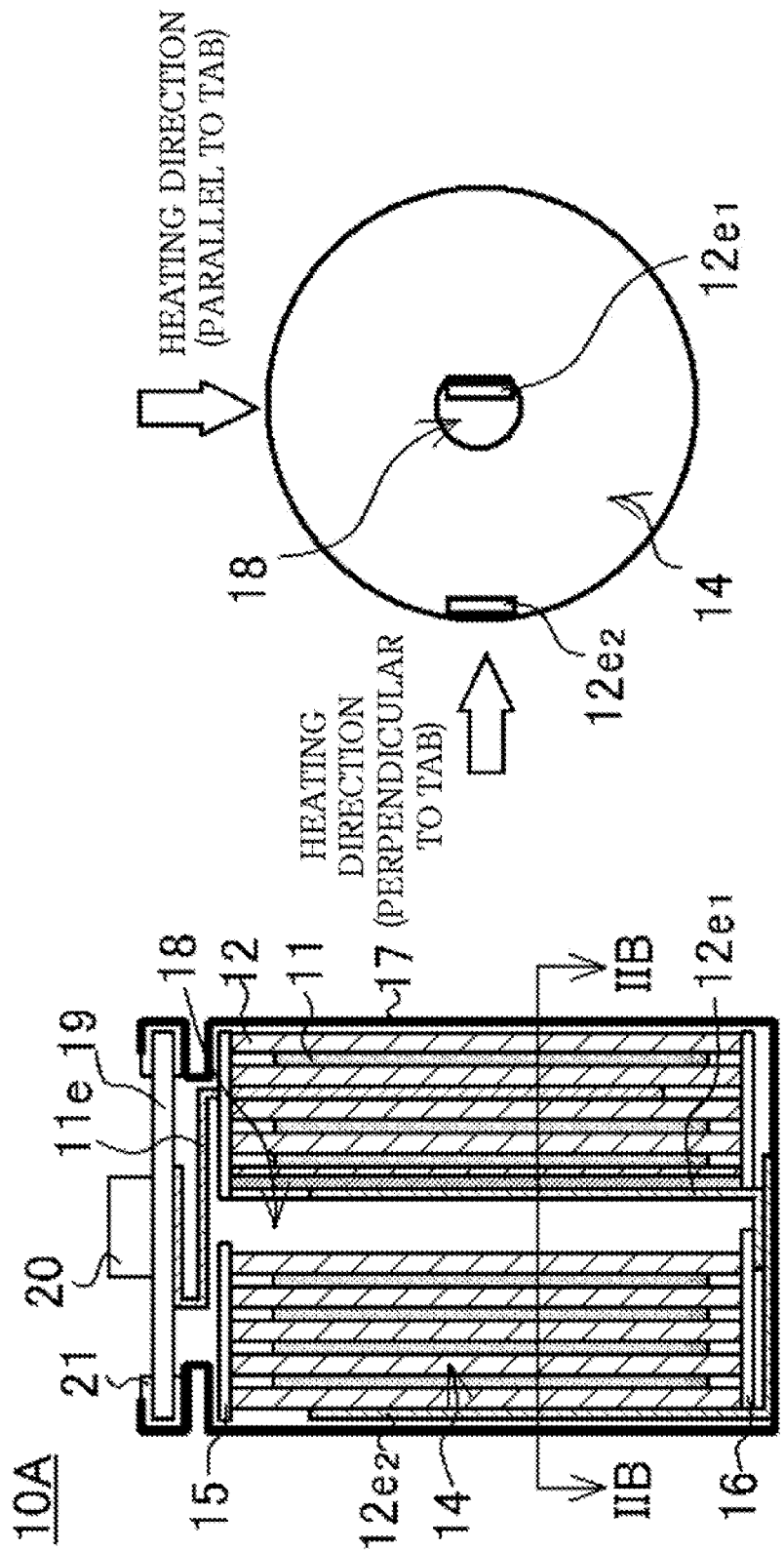

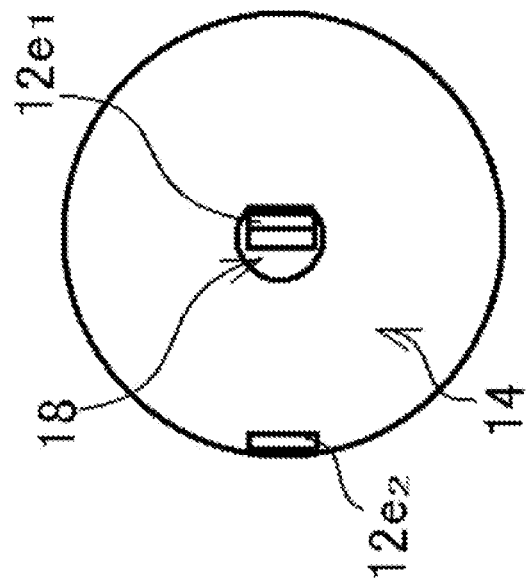
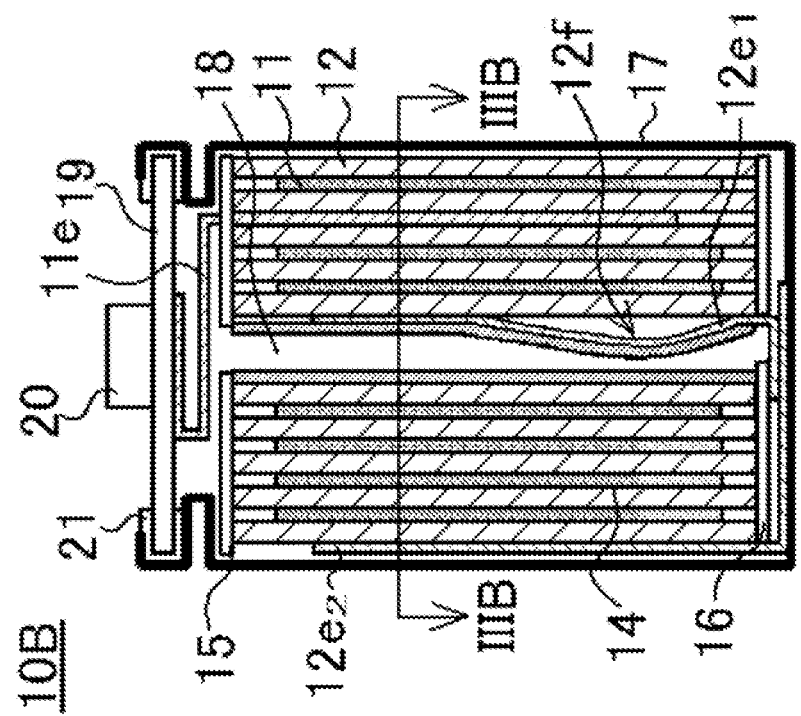

NONAQUEOUS ELECTROLYTE SECONDARY BATTERY

TECHNICAL FIELD

The present invention relates to a nonaqueous electrolyte secondary battery and particularly relates to a nonaqueous electrolyte secondary battery that includes a cylindrical nonaqueous electrolyte secondary battery having as large capacity and characteristics excellent in safety and reliability even without a center pin with a readjusted structure of a collector tab of one electrode plate.

BACKGROUND ART

Along with the spread of mobile instruments in recent years, sealed batteries of small size, light weight, and high energy density have been desired as a power supply for these mobile instruments. Of the sealed batteries, secondary batteries capable of charging and discharging, such as nickel-hydrogen storage batteries and lithium-ion secondary batteries, have been increasingly used in terms of economy. In particular, nonaqueous electrolyte secondary batteries represented by a lithium-ion secondary battery have been increasingly used due to their lighter weight and higher energy density than other secondary batteries.

However, gas is generated in the secondary battery from decomposition of the electrolyte in an overcharge state where current is supplied longer than normal at the time of charging, when exposed to high temperature, or in a short-circuit state where a large current flows due to misuse and failure of an instrument to be used, for example. The generation of gas causes an increase in battery internal pressure. When such overcharge, exposure to high temperature, or a short-circuit state continues, the battery internal pressure can further increase to reach a dangerous state. Therefore, particularly in the case of a nonaqueous electrolyte secondary battery, those provided with a safety valve for explosion protection have been frequently used.

The safety valve needs to reliably activate in order to prevent damage of an instrument and prevent fire accidents, for example. Therefore, as shown in Patent Document 1 below, for example, a cylindrical nonaqueous electrolyte secondary battery has the following configuration: a wound electrode assembly is formed by spirally winding a positive electrode plate and a negative electrode plate that are arranged to face each other with a separator therebetween into a shape having a hollow portion at the center, and is arranged in a battery outer can; and a cylindrical center pin is arranged in the hollow portion of the wound electrode assembly, so that gas generated by an abnormal state such as overcharge is guided to the safety valve via the center pin arranged in the hollow portion of the wound electrode assembly. The center pin is provided to prevent the hollow portion from being crushed and blocking a gas passage when the pressure caused by the gas generated inside the cylindrical nonaqueous electrolyte secondary battery is applied in a stacking direction of the positive electrode plate, the negative electrode plate, and the separator.

In this manner, in a cylindrical nonaqueous electrolyte secondary battery, safety and reliability at the time of abnormality such as overcharge can be ensured by providing the center pin in the hollow portion of the wound electrode assembly. However, providing the center in increases the number of parts and causes a disadvantage in terms of productivity and cost. In addition, although a further increase in battery capacity has been desired in recent years, the space for the center pin is a dead space when the center pin is provided, and it is difficult to increase the battery capacity.

Meanwhile, to prevent power loss inside a battery and reduce heat generation in a nonaqueous electrolyte secondary battery, the efficiency of collecting power from a substrate of an electrode plate is increased by increasing the width of as collector tab to increase the attachment area to the substrate of the electrode plate. However, in a cylindrical nonaqueous electrolyte secondary battery, a configuration in which the width of a collector tab is simply increased cannot be directly employed since the attachment surface of the collector tab is in a curved shape and assembly into a cylindrical battery outer would be difficult. Therefore, in an invention of a cylindrical nonaqueous electrolyte secondary battery disclosed in Patent Document 2 below, a collector tab of an electrode on the innermost circumference side is formed to have the same radius of curvature as a core bar used at the time of preparation of a wound electrode assembly.

Patent Document 3 below discloses a cylindrical nonaqueous electrolyte secondary battery in which two negative electrode collector tabs are provided on the winding start side and the winding end side of a negative electrode substrate to reduce the contact resistance between the negative electrode collector tab and a battery outer can without particularly increasing the width of the collector tab. For the cylindrical nonaqueous electrolyte secondary battery disclosed in Patent Document 3 below, an example is shown as follows: the collector tab provided on the winding end side is bent toward the winding center after preparation of a wound electrode assembly; three layers of the collector tab on the winding start side, the collector tab on the winding end side, and the battery outer can are welded and electrically connected at an inside bottom portion of the battery outer can; and a portion of a shape having elasticity is formed at a joining portion of the collector tab on the winding start side and the battery outer can in order to provide resistance against impact and vibration.

RELATED ART DOCUMENTS

Patent Documents

Patent Document 1: JP-A-6-196138
Patent Document 2: JP-A-2006-310283
Patent Document 3: JP-A-2009-170365

DISCLOSURE OF INVENTION

Problem to be Solved by the Invention

With the cylindrical nonaqueous electrolyte secondary battery disclosed in Patent Document 2 above, the contact area between the electrode on the innermost circumference side and the collector tab can be supposedly increased. However, a step of processing the collector tab to have the same radius of curvature as the core bar used at the time of preparation of the wound electrode assembly is required separately. In addition, Patent Document 2 above does not suggest anything about electrically connecting the collector tab by joining with the inside bottom portion of the battery outer can.

In the cylindrical nonaqueous electrolyte secondary battery disclosed in Patent Document 3 above, the collector tab is connected with the substrate on both the winding start side and the winding end side of the wound electrode assembly. Therefore, even with a width of the collector tab equivalent to that in related art, two conductive paths are ensured between the winding start side of the substrate and the battery outer can and between the winding end side of the substrate and the battery outer can. Thus, a cylindrical nonaqueous electrolyte secondary battery in which the internal resistance is small can be obtained. Moreover, since the portion of a shape having elasticity is formed at the joining portion of the collector tab on the winding start side and the battery outer can, metal fatigue is less likely to occur at a welding portion even in the case of exposure to impact or vibration as in the case use for an electric vehicle (EV), hybrid electric vehicle (HEV), or electric tool. This provides an advantageous effect of preventing the collector tab from falling from the welding portion or the internal resistance from increasing.

However, a center pin is not provided in the cylindrical nonaqueous electrolyte secondary battery shown in Cited Documents 2 and 3 above. Thus, securement of safety and reliability is insufficient in the case where overcharge, exposure to high temperature, a short-circuit state, or the like continues.

In view of the above-mentioned problems in the related art, the present invention provides a nonaqueous electrolyte secondary battery that includes a cylindrical nonaqueous electrolyte secondary battery having a large capacity and characteristics excellent in safety and reliability even without a center pin with a readjusted structure of a collector tab of a wound electrode assembly.

Means for Solving Problem

To achieve the object described above, a nonaqueous electrolyte secondary battery of the present invention includes a wound electrode assembly in which a positive electrode plate having a positive electrode mixture layer formed on both surfaces of a positive electrode substrate and a negative electrode plate having a negative electrode mixture layer on both surfaces of a negative electrode substrate with a separator interposed therebetween, and an air gap portion is formed at the winding axis center. One electrode plate of the positive electrode plate and the negative electrode plate has a substrate exposed portion formed on the winding start side thereof, and the substrate exposed portion on the winding start side is joined to a first collector tab. The wound electrode assembly is enclosed together with a nonaqueous electrolyte in a battery outer can, and the battery outer can is sealed by a sealing plate. The first collector tab is bent and joined so as to touch an inside bottom portion of the battery outer can at a position corresponding to the air gap portion of the wound electrode assembly. The other electrode plate of the positive electrode plate and the negative electrode plate has a substrate exposed portion joined to a second collector tab electrically connected to a terminal fixed to the sealing plate. The air gap portion of the wound electrode assembly is formed in a shape having an arc portion and a chord portion in a plan view. The first collector tab is made to be linear along the chord portion of the substrate exposed portion on the winding start side in a plan view and is joined to the substrate exposed portion at the chord portion.

In the nonaqueous electrolyte secondary battery of the invention, the first collector tab is joined to the substrate exposed portion on the winding start side of one of the positive electrode plate and the negative electrode plate, is made to be linear along the chord portion on the air gap portion side in a plan view, and is joined at the chord portion. Therefore, even in a state where deformation is caused in a radial direction of the wound electrode assembly by, for example, generation of gas inside the battery, three-dimensional support of the first collector tab arranged at the air gap portion can prevent the air gap portion from being blocked. Thus, with the nonaqueous electrolyte secondary battery of the invention, the air gap portion is less likely to be blocked even in a state where a change in the radial direction is caused in the wound electrode assembly by gas generation inside the battery in the case of overcharge, exposure to high temperature, or the like. This can secure a gas flow path to safety valve means provided in the nonaqueous electrolyte secondary battery, and therefore a nonaqueous electrolyte secondary battery with high safety and reliability can be obtained. Moreover, in the nonaqueous electrolyte secondary battery of the invention, a center pin is not provided in the air gap portion, and therefore the battery capacity can be increased accordingly.

In the invention, a "plan view" indicates a state where the wound electrode assembly is seen from an extending direction of the winding axis of the wound electrode assembly, and is substantially equivalent to a cross-sectional view in which the wound electrode assembly is cut along a plane perpendicular to the winding axis. In the nonaqueous electrolyte secondary battery of the invention, a safety valve may be provided in either way of direct formation at the sealing plate, formation within a terminal fixed to the sealing plate or direct formation at the battery outer can. Furthermore, the nonaqueous electrolyte secondary battery of the invention can be employed in either a cylindrical nonaqueous electrolyte secondary battery or an elliptic cylindrical nonaqueous electrolyte secondary battery.

In forming the air gap portion of the wound electrode assembly into as shape having the arc portion and the chord portion in a plan view, the formation is facilitated by using a column body with a shape having a chord in a cross-sectional plane as the core bar used in forming the wound electrode assembly, instead of that with a cylindrical shape. "Joining" in the invention includes not only "welding" but also "pressure welding," and "welding" further includes resistance welding, ultrasonic welding, laser welding, and electron beam welding.

Aluminum foil is generally used for the positive electrode substrate of the nonaqueous electrolyte secondary battery, and copper foil for the negative electrode substrate. An iron-based alloy such as stainless steel is generally used for the battery outer can and a terminal. Therefore, in the nonaqueous electrolyte secondary battery of the invention, it is preferable that the substrate exposed portion be formed on the winding start side of the negative electrode plate, and that a negative electrode tab (first collector tab) joined to the negative electrode substrate exposed portion be formed using nickel, nickel alloy, a copper-nickel two-layered clad material, or a nickel-copper-nickel three-layered clad material, and it is preferable that a positive electrode collector tab (second collector tab) be formed using aluminum, in consideration of ease of joining, joining strength, strength of the collector tab, and the like.

As a negative electrode active material in the nonaqueous electrolyte secondary battery of the invention, a carbonaceous material such as graphite and amorphous carbon can be used. As a positive electrode active material, lithium transition-metal composite oxides can be used that are represented by $Li_xMO_2$ (M is at least one of Co, Ni, and Mn) and are capable of reversibly absorbing and desorbing lithium ions, namely, $LiCoO_2$, $LiNiO_2$, $LiNi_yCo_{1-y}O_2$ (y=0.01 to 0.99), $LiMnO_2$, $LiMn_2O_4$, $LiCo_xMn_yNi_zO_2$ (x+y+z=1), or $LiFePo_4$. Such lithium transition-metal composite oxides may be used alone, or two or more of them may be mixed to be used. A part of transition metal may be replaced by Zr, Mg, Al, or the like.

Examples of the negative electrode active material that can be used in the nonaqueous electrolyte secondary battery of the invention include: a carbon raw material such as graphite, non-graphitizable carbon, and graphitizable carbon; a titanium oxide such as $LiTiO_2$, spinel-type $Li_4Ti_5O_{12}$, and $TiO_2$; a metalloid element such as silicon and tin; and a Sn—Co alloy.

Examples of a nonaqueous solvent that can be used for the nonaqueous electrolyte secondary battery of the invention include: a cyclic carbonate such as ethylene carbonate (EC), propylene carbonate (PC), and butylene carbonate (BC); a fluorinated cyclic carbonate; a cyclic carboxylic ester such as γ-butyrolactone (BL) and γ-valerolactone (VL); a chain carbonate such as dimethyl carbonate (DMC), ethyl methyl carbonate (EMC), diethyl carbonate (DEC), methylpropyl carbonate (MPC), and dibutyl carbonate (DBC); at fluorinated chain carbonate; a chain carboxylic ester such as methyl pivalate, ethyl pivalate, methyl isobutyrate, and methyl propionate; an amide compound such as N,N'-dimethylformamide and N-methyl oxazolidinone; a sulfur compound such as sulfolane; and an ambient-temperature molten salt such as 1-ethyl-3-methylimidazolium tetrafluoroboric acid. It is desirable that two or more of them be mixed to be used. Of these, preferred are a cyclic carbonate ester and a chain carbonate ester that have a particularly large permittivity and large nonaqueous electrolyte ion conductivity. In the nonaqueous electrolyte secondary battery of the invention, the nonaqueous electrolyte may be not only in liquid form but also in a gel.

As the separator used in the nonaqueous electrolyte secondary battery of the invention, a separator can be selected that is formed using a microporous film of a polyolefin material such as polypropylene and polyethylene. To ensure the shutdown responsiveness of the separator, a resin with a low melting point may be mixed. Furthermore, a laminate body with a high-melting point resin and a resin carrying an inorganic particle may be used for obtaining heat resistance.

Within the nonaqueous electrolyte used in the nonaqueous electrolyte secondary battery of the invention, the following compounds may be further added as compounds for stabilization of an electrode: vinylene carbonate (VC), vinyl ethyl carbonate (VEC), succinic anhydride (SUCAH), maleic anhydride (MAAH), glycolic anhydride, ethylene sulfite (ES), divinyl sulfone (VS), vinyl acetate (VA), vinyl pivalate (VP), catechol carbonate, and biphenyl. Two or more of these compounds can also be mixed for use as appropriate.

In the nonaqueous electrolyte secondary battery of the invention, a lithium salt that is commonly used as an electrolyte salt for an nonaqueous electrolyte secondary battery may be used as an electrolyte salt dissolved in the nonaqueous solvent. Examples of such a lithium salt are as follows: $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures of these substances. In particular, among them, it is preferable that $LiPF_6$ (lithium hexafluorophosphate) be used. The amount of dissolution of the electrolyte salt with respect to the nonaqueous solvent is preferably from 0.5 to 2.0 mol/L.

In the nonaqueous electrolyte secondary battery of the invention, the first collector tab preferably has a portion of a shape having elasticity between a joining portion with the substrate exposed portion and a joining portion with the battery outer can.

With the first collector tab having the portion of a shape having elasticity between the joining portion with the substrate exposed portion and a joining portion with the battery outer can, the air gap portion is less likely to be blocked even in a state where a change in the radial direction is caused in the wound electrode assembly by gas generation inside the battery in the case of overcharge, exposure to high temperature, or the like, and furthermore, an impact upon application of impact due to a fall, vibration, or the like can be absorbed. Thus, an impact applied in the center axis direction of the wound electrode assembly can be withstood with the nonaqueous electrolyte secondary battery of the invention. This largely reduces the possibility of detachment of the joining portion between the first collector tab and the battery outer can, and the internal resistance of the battery is less likely to increase, even in the case where, for example, a drop impact is applied. Moreover, a nonaqueous electrolyte secondary battery with high safety and reliability can be obtained. The portion of a shape having elasticity of the first collector tab in the nonaqueous electrolyte secondary battery of the invention may have a shape such as an arched shape, an arc shape, and a wave shape.

In the nonaqueous electrolyte secondary battery of the invention, the first collector tab is preferably formed using a metal with a hardness of at least HV100.

With the nonaqueous electrolyte secondary battery of the invention, the physical strength of the first collector tab is extremely large, and a change in the radial direction of the wound electrode assembly and an impact applied in the center axis direction can be withstood, because the first collector tab is formed using a metal with a hardness of HV100 or greater. Thus, a nonaqueous electrolyte secondary battery that is more excellent in safety and reliability can be obtained. An HV less than 100 is not preferable because the shape retaining capability of the air gap portion decreases in a state where a change in the radial direction is caused in the wound electrode assembly by gas generation inside the battery in the case of overcharge, exposure to high temperature, or the like.

In the nonaqueous electrolyte secondary battery of the invention, it is preferable that the one electrode plate also have a substrate exposed portion formed on the winding end side thereof, the substrate exposed portion on the winding end side of the one electrode plate be joined to a third collector tab, the third collector tab be bent so as to touch the inside bottom portion of the battery outer can at a position corresponding to the air gap portion of the wound electrode assembly and joined integrally with the first collector tab and the inside bottom portion of the battery outer can.

With the nonaqueous electrolyte secondary battery of the invention, a total of two conductive paths are ensured between the substrate exposed portion of a winding start portion and the battery outer can by the first collector tab and between the substrate exposed portion of a winding end portion and the battery outer can by the third collector tab, even if the width of the collector tab is equivalent to that of the related art. Therefore, a nonaqueous electrolyte secondary battery with a smaller internal resistance can be obtained.

BRIEF DESCRIPTION OF DRAWINGS

FIG. 1A is a development view of a positive electrode plate used in a nonaqueous electrolyte secondary battery of each example and comparative example, FIG. 1B is a development view of a negative electrode plate in the same manner, FIG. 1C is a plan view of a core bar used in each example, and FIG. 1D is a plan view of a core bar used in each comparative example.

FIG. 2A is a vertical-sectional view of a nonaqueous electrolyte secondary battery of Example 1, and FIG. 2B is a sectional view along line IIB-IIB in FIG. 2A.

FIG. 3A is a vertical-sectional view of a nonaqueous electrolyte secondary battery of Example 2, and FIG. 3B is a sectional view along line IIIB-IIIB in FIG. 3A.

BEST MODE(S) FOR CARRYING OUT THE INVENTION

Figure 4B:
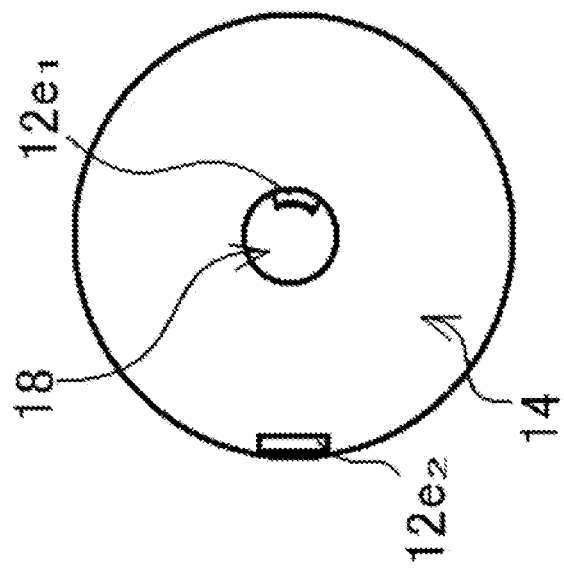
FIG. 4B is a sectional view along line IVB-IVB in FIG. 4A.

An embodiment for carrying out the present invention will be described below in detail using each example and comparative example. The examples below show examples of a cylindrical nonaqueous electrolyte secondary battery as a nonaqueous electrolyte secondary battery for embodying the technical idea of the present invention and is not intended to specify the present invention as the cylindrical nonaqueous electrolyte secondary battery. The present invention is equally applicable to various modifications without departing from the technical idea shown in the scope of claims. In each drawing used for illustration in the specification, the members are shown in different scales as appropriate so that each member is in a size recognizable in the drawing, and are not necessarily shown in proportion to the actual dimensions.

First, using FIG. 1, the following describes a configuration of a positive electrode plate, a negative electrode plate, and a nonaqueous electrolyte common to Examples 1 and 2 and Comparative Examples 1 and 2. FIG. 1A is a development view of a positive electrode plate used in a nonaqueous electrolyte secondary battery of each example and comparative example, FIG. 1B is a development view of a negative electrode plate in the same manner, FIG. 1C is a plan view of a core bar used in each example, and FIG. 1D is a plan view of a core bar used in each comparative example.

[Preparation of a Positive Electrode Plate]

A positive electrode plate 11 was prepared in the following manner. First, the following materials were dispersed in N-methyl-2-pyrrolidone to prepare a positive electrode mixture slurry: 90 parts by mass of a positive electrode active material in which lithium nickel-cobalt-manganese oxide (LiNi$_{1/3}$Co$_{1/3}$Mn$_{1/3}$O$_2$) and spinel-type lithium manganese oxide were mixed at a mass ratio of 1:1 as the positive electrode active material; 5 parts by mass of graphite as a conducting agent; and 5 parts by mass of polyvinylidene fluoride (PVdF) as a binding agent. Next, the positive electrode mixture slurry was applied to both surfaces of a positive electrode substrate 11a formed using aluminum foil with a thickness of 20 µm so that a middle portion and an end portion on the winding end side of the positive electrode substrate 11a were exposed. The resultant object was then passed through a drier to remove the organic solvent, and pressed by a roll press machine so that the thickness of a portion in which a positive electrode mixture layer 11d was formed was 100 µm. Next, a positive electrode collector tab 11e of aluminum metal with a width of 3 mm and a thickness of 0.15 mm was attached by ultrasonic welding to a positive electrode substrate exposed portion 11b on the center side of the positive electrode substrate 11a to obtain the positive electrode plate 11 (see FIG. 1A).

[Preparation of a Negative Electrode Plate]

A negative electrode plate 12 was prepared in the following manner. First, 98% by mass of artificial graphite powder as a negative electrode active material and 1% by mass each of carboxymethyl cellulose (CMC) and styrene-butadiene rubber (SBR) as a binding agent were mixed, water was added thereto, and the resultant substance was kneaded to prepare a negative electrode mixture slurry. Next, the negative electrode mixture slurry was applied to both surfaces of a negative electrode substrate 12a of copper foil with a thickness of 15 µm so that both surfaces of end portions on the winding start side and winding end side of the negative electrode substrate 12a were exposed. The resultant object was then passed through a drier to be dried, and then pressed by as roll press machine so that the thickness of a negative electrode mixture layer 12d was 100 µm.

Next, a negative electrode collector tabs 12$e_1$ (corresponding to a "first collector tab" of the present invention) and 12$e_2$ (corresponding to a "third collector tab" of the present invention) formed of a copper-nickel clad material (of which the hardness HV is 80 for copper and 140 for Ni) with a width of 3 mm and thickness of 0.15 mm were attached by ultrasonic welding to a negative electrode substrate exposed portion 12b on the winding start side and a negative electrode substrate exposed portion 12c on the winding end side of the negative electrode substrate 12a so that coppers face each other to obtain the negative electrode plate 12 (see FIG. 1B).

In Comparative Examples 1 and 2, the negative electrode collector tab 12$e_1$ was processed to have the same radius of curvature as that of a core bar 13B in advance before welding the negative electrode collector tab 12$e_1$ so that the contact area between the negative electrode plate 12 on the innermost circumference side and the negative electrode collector tab 12$e_1$ was large, and then the negative electrode collector tab 12$e_1$ was welded by ultrasonic welding to a winding outside surface of the negative electrode substrate exposed portion 12b of the negative electrode plate 12 on the innermost circumference side. The application amount of the negative electrode mixture was adjusted so that the charge capacity ratio (negative electrode charge capacity/positive electrode charge capacity) was 1.1 in a portion where the positive electrode plate 11 and the negative electrode plate 12 face each other at a charging voltage (4.2 V) as a design reference.

[Preparation of a Wound Electrode Assembly]

The shape of a core bar 13A used in Examples 1 and 2 in a plan view is shown in FIG. 1C, and the shape of the core bar 13B used in Comparative Examples 1 and 2 in a plan view is shown in FIG. 1D. A cylindrical wound electrode assembly 14 used in nonaqueous electrolyte secondary batteries 10A to 10D in Examples 1 and 2 and Comparative Examples 1 and 2 was prepared as follows: The positive electrode plate 11 and the negative electrode plate 12 prepared in a manner described above and a microporous separator (omitted in the drawing) with a thickness of 22 µm that is formed of, for example, a polyethylene resin were each inserted on the winding start side to a slit 13a of the core bar 13A or 13B attached to a winding machine (omitted in the drawing), and wrapped around the core bar 13A or 13B to be wound. An insulating fixing tape was attached to a winding end portion for fixation. The core bars 13A and 13B were then removed.

In Examples 1 and 2, winding was done so that the negative electrode collector tab 12$e_1$ on the winding start side touches a flat portion 13b of the core bar 13A. That is in the cylindrical wound electrode assembly 14 in Examples 1 and 2, an air gap portion 18 is formed in as shape having an arc portion and a chord portion in a plan view, and the negative electrode collector tab 12$e_1$ on the winding start side is made to be linear along the chord portion of the negative electrode substrate exposed portion 12b on the winding start side in a plan view and is joined to the negative electrode substrate exposed portion 12b on the winding start side at the chord portion. Furthermore, in all of Examples 1 and 2 and Comparative Examples 1 and 2, the length of the negative electrode substrate exposed portion 12b on the winding start side located on the innermost circumference side is greater than or equal to the outer circumference of the air gap portion 18.

[Preparation of a Nonaqueous Electrolyte]

A nonaqueous mixed solvent was prepared with 15% by volume of ethylene carbonate (EC), 10% by volume of propylene carbonate (PC), and 75% by volume of dimethyl carbonate (DMC), and $LiPF_6$ was dissolved therein so that the proportion was 1.0 mol/L to obtain a nonaqueous electrolyte.

[Preparation of a Battery of Example 1]

Insulating plates 15 and 16 having a hole at the center were arranged on and beneath the wound electrode assembly 14 prepared in a manner described above. The negative electrode collector tab $12e_2$ on the winding end side of the negative electrode plate 12 was bent at an appropriate position so that a tip end portion was parallel to a bottom portion of a battery outer can 17. The negative electrode collector tab $12e_1$ on the winding start side of the negative electrode plate 12 was attached to be linear in a plan view on a winding inside surface of the negative electrode substrate exposed portion 12b on the winding start side. A tip end portion of the negative electrode collector tab $12e_1$ on the winding start side was bent so as to be parallel to the bottom portion of the battery outer can 17 and overlap the tip end portion of the collector tab $12e_2$ on the winding end side. The wound electrode assembly 14 including the negative electrode collector tabs $12e_1$ and $12e_2$ bent in this manner was inserted into the cylindrical battery outer can 17, as shown in FIG. 2A. Next, the negative electrode collector tabs $12e_1$ and $12e_2$ were fixed to the inside of the bottom portion of the battery outer can 17 by simultaneous resistance welding.

Furthermore, a tip end portion of the positive electrode collector tab 11e was ultrasonically welded to a positive electrode terminal 20 attached to an insulating sealing plate 19, and the nonaqueous electrolyte described above was poured into the battery outer can for vacuum impregnation. The periphery of the sealing plate 19 was then clamped with a gasket 21, and an opening end portion of the battery outer can 17 was crimped and fixed to prepare the nonaqueous electrolyte secondary battery 10A of Example 1. The nonaqueous electrolyte secondary battery 10A of Example 1 was 18 mm in diameter, 65 mm in length, and 1250 mAh in design capacity.

[Preparation of a Battery of Example 2]

In the nonaqueous electrolyte secondary battery 10B of Example 2, the negative electrode collector tab $12e_1$ on the winding start side used in Example 1 was bent so that an arched shape portion 12f was formed at the time of sealing of the battery, and ultrasonically welded to the winding outside surface of the negative electrode substrate exposed portion 12b of the negative electrode plate 12 on the innermost circumference side, as shown in FIG. 3A and FIG. 3B. The other configurations were prepared in the same manner as the case of the nonaqueous electrolyte secondary battery 10A of Example 1.

[Preparation of a Battery of Comparative Example 1]

Figure 4A:
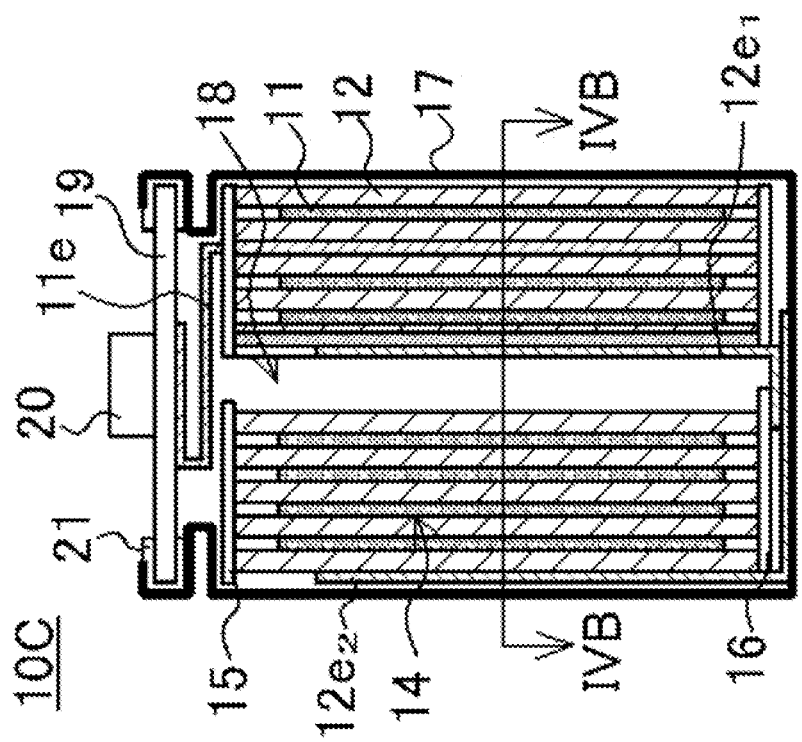
FIG. 4A is a vertical-sectional view of as nonaqueous electrolyte secondary battery of Comparative Example 1.

In the nonaqueous electrolyte secondary battery 10C of Comparative Example 1, as shown in FIGS. 4A and 4B, the negative electrode collector tab $12e_1$ on the winding start side used in Example 1 was processed to have the same radius of curvature as the core bar 13B (see FIG. 1D) used at the time of preparation of the wound electrode assembly 14, so that the contact area between the negative electrode plate 12 on the innermost circumference side and the negative electrode collector tab $12e_1$ was large. The negative electrode collector tab $12e_1$ on the winding start side was then ultrasonically welded to the winding outside surface of the negative electrode substrate exposed portion 12b of the negative electrode plate 12 on the innermost circumference side. The other configurations were prepared in the same manner as the case of the nonaqueous electrolyte secondary battery 10A of Example 1.

[Preparation of a Battery of Comparative Example 2]

Figures 5A, 5B:
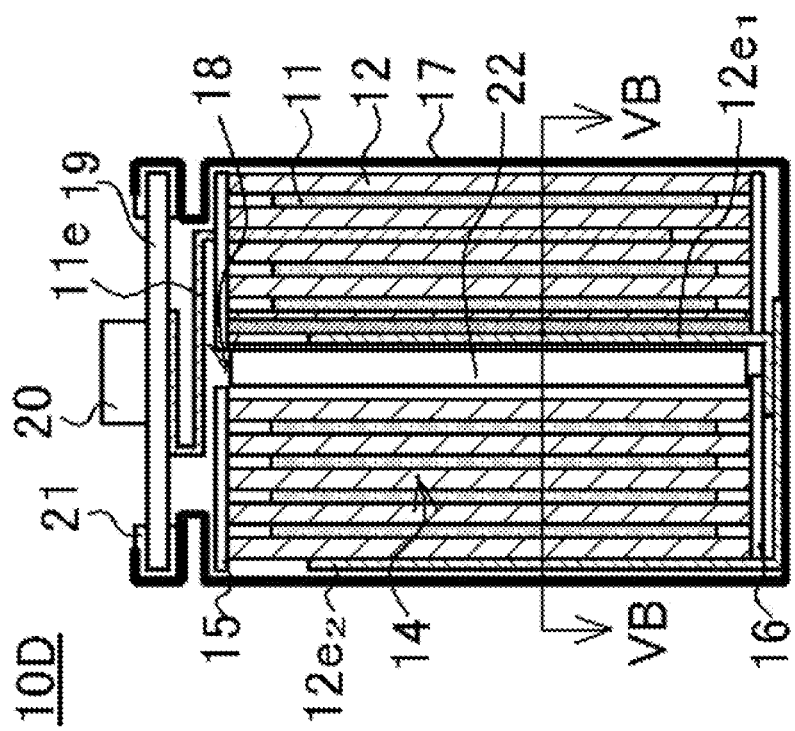
FIG. 5A is a vertical-sectional view of a nonaqueous electrolyte secondary battery of Comparative Example 2.
FIG. 5B is a sectional view along line VB-VB in FIG. 5A.

In the nonaqueous electrolyte secondary battery 10D of Comparative Example 2, a center pin 22 formed using a hollow pipe of stainless steel with a length of 60 mm, an outer diameter of 3 mm, and a thickness of 0.15 mm was inserted into the air gap portion 18 of the nonaqueous electrolyte secondary battery 10C of Comparative Example 1, as shown in FIGS. 5A and 5B. The other configurations were prepared in the same manner as the case of the nonaqueous electrolyte secondary battery 10C of Comparative Example 1.

[Heating Test]

To simulate an overcharge state, 20 pieces each of the nonaqueous electrolyte secondary batteries 10A to 10D of Examples 1 and 2 and Comparative Examples 1 and 2 prepared in a manner described above were charged with a low charging current of 1 It=1250 mA until the battery voltage reached 4.25 V. After the battery voltage reached 4.25 V, the batteries were charged with a constant voltage of 4.25 V until the current reached 1/50 It=25 mA. With respect to a side surface of the respective batteries in such an overcharged state, 10 pieces for each battery were heated for 10 minutes using a Bunsen burner from a direction parallel to the negative electrode collector tab, and another 10 pieces for each battery were heated from a perpendicular direction, as shown in FIG. 2B. Subsequently, for each battery, the presence or absence of a breakage state was checked visually for measurement. The results are listed in Table 1.

TABLE 1

| Heating Direction | Example 1 | Example 2 | Comparative Example 1 | Comparative Example 2 |
|---|---|---|---|---|
| Side surface (parallel to tab) | 10/10 OK | 10/10 OK | *9/10 OK | 10/10 OK |
| Side surface (perpendicular to tab) | *7/10 OK | 10/10 OK | *7/10 OK | 10/10 OK |

*Partial breakage observed

The results shown in Table 1 demonstrate the following. That is, with the nonaqueous electrolyte secondary battery 10A of Example 1, a favorable pressure resistance effect was obtained in the case of heating from a direction parallel to the negative electrode collector tab $12e_1$, but no improvement effect relative to Comparative Example 1 was observed in the case of heating from a direction perpendicular to the negative electrode collector tab $12e_1$. This shows the following. The wound electrode assembly 14 expands, in other words, acts to narrow the air gap portion 18 in the same direction as the heating direction. However, the wound electrode assembly 14 acts as a pressing force in the width direction of the negative electrode collector tab $12e_1$ in the case of heating from the direction parallel to the negative electrode collector tab $12e_1$. Thus, the negative electrode collector tab $12e_1$ is less likely to be bent, and consequently a favorable effect of pressure resistance can be obtained. In addition, no improvement in the pressure resistance effect was observed in the case of heating from the direction perpendicular to the negative electrode collector tab $12e_1$ because the negative electrode collector tab $12e_1$ is easily bent into a curved shape.

With the nonaqueous electrolyte secondary battery 10B of Example 2, a favorable effect was obtained for both of the cases of heating from the direction parallel to the negative electrode collector tab $12e_1$ and from the direction perpendicular thereto. This is supposedly because the negative electrode collector tab $12e_1$ is less likely to be bent into the curved shape even in the case of heating from the direction perpendicular to the negative electrode collector tab $12e_1$ because the arched shape portion $12f$ is formed in the negative electrode collector tab $12e_1$, thereby causing the effect as described above.

In contrast, the nonaqueous electrolyte secondary battery 10C of Comparative Example 1 only provided a result inferior to that of the nonaqueous electrolyte secondary battery 10B of Example 2 either in the case of heating from the direction parallel to the negative electrode collector tab $12e_1$ or in the case of heating from the direction perpendicular to the negative electrode collector tab $12e_1$. The nonaqueous electrolyte secondary battery 10D of Comparative Example 2, in which a center pin 28 is additionally provided in the nonaqueous electrolyte secondary battery 10C of Comparative Example 1, provided a favorable effect as in the case of the nonaqueous electrolyte secondary battery 10B of Example 2.

The results described above show that the nonaqueous electrolyte secondary battery of the present invention can provide more favorable results on a heat resistance test than in the case of Comparative Example 1 corresponding to the related art, in which a center pin is not provided, even if an arched portion is not formed in the negative electrode collector tab. A favorable result on a heating test can be obtained when the center pin is used as in Comparative Example 2 even if the configuration of the wound electrode assembly of the present invention is not provided. However, with the nonaqueous electrolyte secondary battery of the present invention, particularly in the case where an arched shape is formed in the negative electrode collector tab, as favorable result on a heating test similar to the case where the center pin is provided can be obtained even if a center pin is not used, and therefore the battery capacity can be increased in accordance with the omission of the center pin.

Example 2 described above shows an example in which the portion of a shape having elasticity of the collector tab is the arched shape portion $12f$. However, an arc shape, wave shape, or the like is also applicable. Examples 1 and 2 described above show examples in which the negative electrode plate is on the innermost circumference side and the negative electrode collector tab is formed on the winding start side of the negative electrode plate. However, the arrangement of the negative electrode plate and the positive electrode plate may be reversed so that the winding start side of the positive electrode plate is on the innermost circumference side and a positive electrode collector tab is formed at the positive electrode plate. However, in nonaqueous electrolyte secondary batteries represented by lithium-ion secondary batteries, the charge capacity ratio (negative electrode charge capacity/positive electrode charge capacity) in a portion where a positive electrode plate and a negative electrode plate face each other is generally greater than 1, for example, approximately 1.1. A configuration in which the negative electrode plate is located on the innermost circumference side enables the negative electrode plate to be wound so as to be also located on the outermost circumference side. Thus, the charge capacity ratio of the negative electrode plate can be easily made greater than the charge capacity ratio of the positive electrode plate.

EXPLANATIONS OF LETTERS OR NUMERALS 10A to 10D Nonaqueous electrolyte secondary battery
11 Positive electrode plate
11a Positive electrode substrate
11b Positive electrode substrate exposed portion on the center side
11c Positive electrode substrate exposed portion on the winding end side
11d Positive electrode mixture layer
11e Positive electrode collector tab
12 Negative electrode plate
12a Negative electrode substrate
12b Negative electrode substrate exposed portion on the winding start side
12c Negative electrode substrate exposed portion on the winding end side
12d Negative electrode mixture layer
$12e_1$ and $12e_2$ Negative electrode collector tab
12f Arched shape portion
13 Core bar
14 Wound electrode assembly
15 and 16 insulating plate
17 Battery outer can
18 Air gap portion
19 Sealing plate
20 Positive electrode terminal
21 Gasket
22 Center pin

The invention claimed is:

1. A nonaqueous electrolyte secondary battery comprising:
a wound electrode assembly in which a positive electrode plate having a positive electrode mixture layer formed on both surfaces of a positive electrode substrate and a negative electrode plate having a negative electrode mixture layer on both surfaces of a negative electrode substrate with a separator interposed therebetween, and an air gap portion is formed at the winding axis center,
one electrode plate of the positive electrode plate and the negative electrode plate having a substrate exposed portion formed on the winding start side thereof, and the substrate exposed portion on the winding start side being joined to a first collector tab,
the wound electrode assembly being enclosed together with a nonaqueous electrolyte in a battery outer can, and the battery outer can being sealed by a sealing plate,
the first collector tab being bent and joined so as to electrically contact an inside bottom portion of the battery outer can at a position corresponding to the air gap portion of the wound electrode assembly,
the other electrode plate of the positive electrode plate and the negative electrode plate having a substrate exposed portion joined to a second collector tab electrically connected to a terminal fixed to the sealing plate,
the air gap portion of the wound electrode assembly being formed in a shape having an arc portion and a chord portion in a plan view, and
the first collector tab being made to be linear along the chord portion of the substrate exposed portion on the winding start side in a plan view and joined to the substrate exposed portion at the chord portion.

2. The nonaqueous electrolyte secondary battery according to claim 1, wherein the first collector tab is bent such that an arched shape portion is formed between a joining portion with the substrate exposed portion and a joining portion with the battery outer can.

3. The nonaqueous electrolyte secondary battery according to claim 1, wherein the first collector tab is formed using a metal with a hardness of at least HV100.

4. The nonaqueous electrolyte secondary battery according to claim 1, wherein the one electrode plate also has a substrate exposed portion formed on the winding end side thereof, the substrate exposed portion on the winding end side of the one electrode plate is joined to a third collector tab, the third collector tab is bent so as to touch the inside bottom portion of the battery outer can at a position corresponding to the air gap portion of the wound electrode assembly and joined integrally with the first collector tab and the inside bottom portion of the battery outer can.

* * * * *